United States Patent
Park et al.

(10) Patent No.: US 11,520,432 B2
(45) Date of Patent: Dec. 6, 2022

(54) INPUT DEVICE AND INTERFACE DEVICE INCLUDING THE SAME

(71) Applicant: Samsung Display Co., Ltd., Yongin-si (KR)

(72) Inventors: Wonsang Park, Yongin-si (KR); Yun-Ho Kim, Hwaseong-si (KR); Chul Kim, Hwaseong-si (KR); Seongjun Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/367,138

(22) Filed: Jul. 2, 2021

(65) Prior Publication Data

US 2022/0027034 A1    Jan. 27, 2022

(30) Foreign Application Priority Data

Jul. 23, 2020    (KR) ........................ 10-2020-0091883

(51) Int. Cl.
*G06F 3/041*    (2006.01)
*G06F 3/0354*    (2013.01)
*G06F 3/038*    (2013.01)
*G06F 3/044*    (2006.01)

(52) U.S. Cl.
CPC .......... *G06F 3/04162* (2019.05); *G06F 3/038* (2013.01); *G06F 3/03545* (2013.01); *G06F 3/0441* (2019.05); *G06F 3/0442* (2019.05); *G06F 3/0412* (2013.01); *G06F 2203/04101* (2013.01); *G06F 2203/04102* (2013.01)

(58) Field of Classification Search
CPC ...... G06F 3/0443; G06F 3/044; G06F 3/0446; G06F 2203/04112; G06F 3/0448; G06F 3/04162; G06F 3/03545; G06F 3/038; G06F 3/0441; G06F 3/0442; G06F 3/0412; G06F 2203/04101; G06F 2203/04102; G06F 3/0383; G06F 3/0445; G06F 3/0416
USPC ........................................................ 345/179
See application file for complete search history.

(56) References Cited

U.S. PATENT DOCUMENTS

| | | | |
|---|---|---|---|
| 9,652,058 B2 | 5/2017 | Watanabe | |
| 10,310,640 B2 | 6/2019 | Lee et al. | |
| 10,795,483 B2 | 10/2020 | Hwang et al. | |
| 2014/0192027 A1* | 7/2014 | Ksondzyk | G06F 3/0448 345/178 |
| 2018/0129305 A1* | 5/2018 | Fleck | G06F 3/03545 |
| 2019/0204939 A1* | 7/2019 | Ju | G06F 3/04166 |
| 2020/0089345 A1 | 3/2020 | Fleck et al. | |
| 2020/0201505 A1* | 6/2020 | Jung | G06F 3/0414 |
| 2021/0284812 A1* | 9/2021 | Heil | C09D 11/106 |

FOREIGN PATENT DOCUMENTS

KR    10-1659036 B1    9/2016
KR    10-2020-0009800 A    1/2020

* cited by examiner

*Primary Examiner* — Koosha Sharifi-Tafreshi
(74) *Attorney, Agent, or Firm* — Lewis Roca Rothgerber Christie LLP

(57) ABSTRACT

An interface device includes: a display device including a display layer and a sensor layer on the display layer; and an input device configured to receive a first signal from the sensor layer and to output a second signal to the sensor layer, wherein a strength of the second signal is determined according to a separation distance between the display device and the input device.

20 Claims, 11 Drawing Sheets

INPUT DEVICE AND INTERFACE DEVICE INCLUDING THE SAME

CROSS-REFERENCE TO RELATED APPLICATION

The present application claims priority to and the benefit of Korean Patent Application No. 10-2020-0091883, filed on Jul. 23, 2020, the entire contents of which are hereby incorporated by reference.

BACKGROUND

Aspects of some embodiments of the present disclosure herein relate to an input device with relatively improved sensing performance and an interface device including the same.

Multimedia electronic devices such as televisions, mobile phones, tablet computers, navigation devices, and game machines may each have a display device for displaying images. The electronic devices may each include an input sensor capable of providing a touch-based input method that enables a user to relatively easily input information or commands in an intuitive and convenient manner, in addition to typical input methods using, for example, a button, a keyboard, or a mouse.

The input sensor may sense a touch or pressure provided by using a user's body. Meanwhile, there is an increasing demand for an active pen for detailed touch input for a user who is familiar with information input using a writing instrument or for a specific application program (e.g., an application program for sketching or drawing).

The above information disclosed in this Background section is only for enhancement of understanding of the background and therefore the information discussed in this Background section does not necessarily constitute prior art.

SUMMARY

Aspects of some embodiments of the present disclosure include an input device with relatively improved sensing performance and include an interface device including the input device and a display device that senses an input by the input device.

According to some embodiments of the inventive concept an interface device includes: a display device including a display layer and a sensor layer on the display layer; and an input device configured to receive a first signal from the sensor layer and to output a second signal to the sensor layer, wherein strength of the second signal is determined according to a separation distance between the display device and the input device.

According to some embodiments, the input device may include: an electrode; a receiver configured to receive the first signal through the electrode; a transmitter which includes a voltage adjuster configured to adjust the strength of the second signal. The transmitter may output the second signal through the electrode; and a controller configured to control operations of the receiver and the transmitter, wherein the separation distance is a distance between the electrode and the display device.

According to some embodiments, the controller may include a distance calculator configured to calculate the separation distance on the basis of the first signal received through the receiver.

According to some embodiments, a reference capacitance value between the electrode and the sensor layer when the separation distance is a minimum value may be stored in the controller.

According to some embodiments, the distance calculator may calculate the separation distance on the basis of the reference capacitance value, and the controller may generate a voltage adjustment signal including voltage information according to the separation distance.

According to some embodiments, the voltage adjuster may adjust the strength of the second signal on the basis of the voltage adjustment signal.

According to some embodiments, the receiver may include a hover detector configured to detect the separation distance on the basis of strength of the first signal.

According to some embodiments, the controller may provide the voltage adjuster with information about a voltage value according to the separation distance detected by the hover detector.

According to some embodiments, the controller may include a lookup table in which a voltage value according to the separation distance is stored, and the controller may provide the voltage adjuster with the voltage value corresponding to the separation distance.

According to some embodiments, a first strength of the second signal when the separation distance is a first distance may be smaller than a second strength of the second signal when the separation distance is a second distance longer than the first distance.

According to some embodiments, a voltage level of the second signal may have a first voltage level or a second voltage level different from the first voltage level and may be determined according to the separation distance.

According to some embodiments, the display layer may include a base layer, a circuit layer on the base layer, a light emitting element layer on the circuit layer, and an encapsulation layer on the light emitting element layer, and the sensor layer may be directly on the encapsulation layer.

According to some embodiments, the display device may further include a sensor driver configured to control an operation of the sensor layer, wherein the sensor layer includes an electrode extending in a first direction and a cross electrode extending in a second direction crossing the first direction, and the sensor driver senses an input by the input device on the basis of a change in capacitance of each of the electrode and the cross electrode and senses a touch input on the basis of a change in mutual capacitance between the electrode and the cross electrode.

According to some embodiments, the input device may be an active pen.

According to some embodiments of the inventive concept, an input device includes: an electrode; a receiver configured to receive a first signal through the electrode; a transmitter configured to output a second signal through the electrode; and a controller configured to control operations of the receiver and the transmitter, wherein the transmitter includes a voltage adjuster configured to adjust a voltage level of the second signal on the basis of the first signal.

According to some embodiments, the controller may include a distance calculator configured to calculate a separation distance between an object providing the first signal and the electrode on the basis of the first signal received through the receiver, and the controller may generate a voltage adjustment signal including voltage information according to the separation distance.

According to some embodiments, the voltage adjuster may adjust the voltage level of the second signal on the basis of the voltage adjustment signal.

According to some embodiments, the receiver may include a hover detector configured to detect a separation distance between an object providing the first signal and the electrode on the basis of strength of the first signal.

According to some embodiments, the voltage adjuster may adjust the voltage level of the second signal on the basis of a voltage value selected according to the separation distance detected by the hover detector.

According to some embodiments, the voltage level of the second signal may be increased when strength of the first signal decreases.

BRIEF DESCRIPTION OF THE FIGURES

The accompanying drawings are included to provide a further understanding of the inventive concept, and are incorporated in and constitute a part of this specification. The drawings illustrate aspects of some embodiments of the inventive concept and, together with the description, serve to describe principles of the inventive concept. In the drawings.

DETAILED DESCRIPTION

Figure 1:
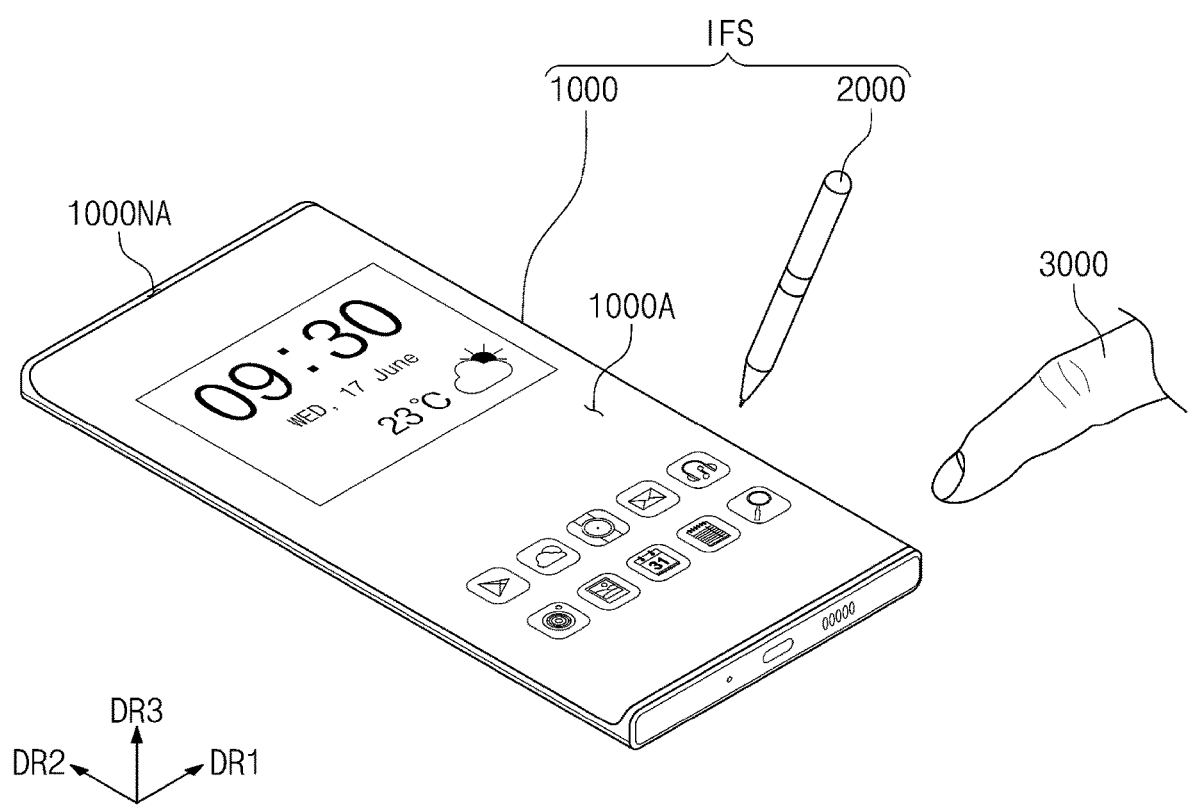
FIG. 1 illustrates an interface device according to some embodiments of the inventive concept.

It will be understood that when an element or layer is referred to as being "on", "connected to" or "coupled to" another element or layer, it can be directly on, connected or coupled to the other element or layer, or intervening elements or layers may be present.

Like reference numerals refer to like elements throughout this specification. In the figures, the thicknesses, ratios and dimensions of elements are exaggerated for effective description of the technical contents.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the singular forms, "a", "an" and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "include" or "have", when used in this specification, specify the presence of stated features, integers, steps, operations, elements, and/or components, but do not preclude the presence or addition of one or more other features, integers, steps, operations, elements, components, and/or groups thereof.

The terms "part" and "unit" mean a software component or a hardware component that performs a specific function. The hardware component may include, for example, a field-programmable gate array (FPGA) or an application-specific integrated circuit (ASIC). The software component may refer to executable code and/or data used by executable code in an addressable storage medium. Thus, software components may be, for example, object-oriented software components, class components, and task components, and may include processes, functions, attributes, procedures, subroutines, program code segments, drivers, firmware, microcodes, circuits, data, databases, data structures, tables, arrays, or variables.

Hereinafter, aspects of some embodiments of the present invention will be explained in more detail with reference to the accompanying drawings.

FIG. 1 illustrates an interface device according to some embodiments of the inventive concept.

Referring to FIG. 1, an interface device IFS may include a display device 1000 and an input device 2000. The display device 1000 may sense an input by the input device 2000. In this specification, the display device 1000 and the input device 2000 may be collectively referred to as the interface device IFS, an electronic system, a touch system, an input/output system, a pen tablet, or a pen terminal.

The display device 1000 may be a device that is activated according to an electrical signal. For example, the display device 1000 may be any suitable electronic device configured to display images, such as a mobile phone, a tablet, a car navigation device, a game machine, or a wearable device, but is not limited thereto. In FIG. 1, the display device 1000 is illustrated as a mobile phone, but embodiments are not limited thereto.

An active area 1000A and a peripheral area 1000NA may be defined in the display device 1000. The display device 1000 may display images at the active area 1000A. The active area 1000A may include a surface defined by a first direction DR1 and a second direction DR2. The peripheral area 1000NA may surround the active area 1000A.

A thickness direction of the display device 1000 may be parallel to a third direction DR3 crossing the first direction DR1 and the second direction DR2. Accordingly, a front surface (or a top surface) and a rear surface (or a bottom surface) of each of members constituting the display device 1000 may be defined in relation to the third direction DR3.

The display device 1000 may sense inputs applied from outside of the display device 1000 (e.g., from one or more external sources, such as a stylus or electronic pen, a touch input from a user, etc.). For example, the display device 1000 may sense a first input by the input device 2000 and a second input by a touch 3000. The second input by the touch 3000 may include various types of external inputs such as a part of a user's body, light, heat, and pressure. The input device 2000 may be an active pen outputting a signal and hereinafter is described as the active pen.

The display device 1000 and the input device 2000 may perform two-way communication with each other. The display device 1000 may provide an uplink signal to the input device 2000. The uplink signal may be provided in plurality. For example, the uplink signal may include information such as panel information and a protocol version but is not particularly limited thereto. The input device 2000 may provide a downlink signal to the display device 1000. The downlink signal may include a synchronization signal or state information of the input device 2000. For example, the downlink signal may include coordinate information of the input device 2000, battery information of the input device 2000, tilt information of the input device 2000, and/or various pieces of information stored in the input device 2000, but the downlink signal is not particularly limited thereto.

Figure 2:
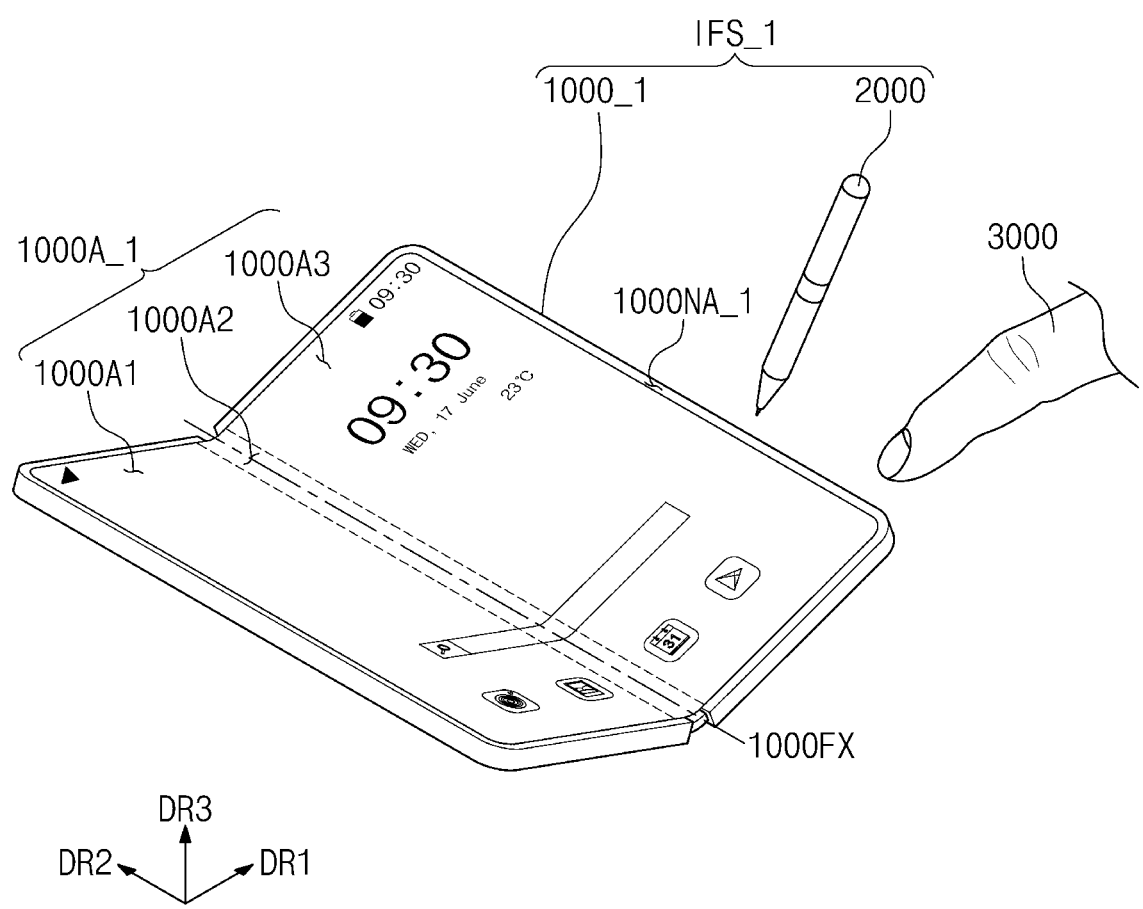
FIG. 2 illustrates an interface device according to some embodiments of the inventive concept.

FIG. 2 illustrates an interface device according to some embodiments of the inventive concept.

Referring to FIG. 2, an interface device IFS_1 may include a display device 1000_1 and an input device 2000. The display device 1000_1 may sense an input by the input device 2000.

The display device 1000_1 may display images at an active area 1000A_1. FIG. 2 illustrates the display device 1000_1 in a state of being folded at an angle (e.g., a set or predetermined angle). When the display device 1000_1 is unfolded, the active area 1000A_1 may include a plane defined by a first direction DR1 and a second direction DR2.

The active area 1000A_1 may include a first area 1000A1, a second area 1000A2, and a third area 1000A3. The first area 1000A1, the second area 1000A2, and the third area 1000A3 may be sequentially defined in the first direction DR1. The second area 1000A2 may be bent about a folding axis 1000FX extending in the second direction DR2. Accordingly, the first area 1000A1 and the third area 1000A3 may be referred to as non-folding areas, and the second area 1000A2 may be referred to as a folding area.

When the display device 1000_1 is folded, the first area 1000A1 and the third area 1000A3 may face each other. Accordingly, in the fully folded state, the active area 1000A_1 may not be exposed to the outside, which may be referred to as in-folding. However, this is merely an example, and an operation of the display device 1000_1 is not limited thereto.

For example, according to some embodiments of the inventive concept, the first area 1000A1 and the third area 1000A3 may be opposing (e.g., facing away from) each other when the display device 1000_1 is folded. Accordingly, in the folded state, the active area 1000A_1 may be exposed to the outside, which may be referred to as out-folding.

The display device 1000_1 may perform only one of in-folding and out-folding operations. Alternatively, the display device 1000_1 may perform both the in-folding operation and the out-folding operation. In this case, the in-folding and out-folding operations may be performed in the same area of the display device 1000_1, for example, the second area 1000A2.

Although one folding area and two non-folding areas are illustrated in FIG. 2 as an example, the number of folding areas and the number of non-folding areas are not limited thereto. For example, the display device 1000_1 may include more than two non-folding areas and a plurality of folding areas respectively located between adjacent non-folding areas.

FIG. 2 illustrates an example according to some embodiments in which the folding axis 1000FX extending in the second direction DR2 (e.g., a direction parallel to a longer side of the display device 1000_1), but embodiments of the inventive concept are not limited thereto. For example, the folding axis 1000FX may extend in a direction parallel to the first direction DR1 (e.g., a direction parallel to a shorter side of the display device 1000_1). In this case, the first area 1000A1, the second area 1000A2, and the third area 1000A3 may be sequentially arranged in the second direction DR2.

The active area 1000A_1 may overlap one or more electronic modules. For example, the electronic modules may include a camera module, a proximity illuminance sensor, and the like. The electronic modules may receive an external input transmitted through the active area 1000A_1 or may provide an output through the active area 1000A_1. A portion of the active area 1000A_1 overlapping the camera module, the proximity illuminance sensor, and the like may have a higher transmittance than the other portion of the active area 1000A_1. Accordingly, an area in which the plurality of electronic modules are to be located need not be provided in a peripheral area 1000NA_1 around the active area 1000A_1. As a result, a surface area ratio of the active area 1000A_1 to the entire surface of the display device 1000_1 may increase.

The display device 1000_1 and the input device 2000 may perform two-way communication with each other. The display device 1000_1 may provide an uplink signal to the input device 2000. The input device 2000 may provide a downlink signal to the display device 1000_1. The display device 1000_1 may detect coordinates of the input device 2000 by using the signal provided from the input device 2000.

Figure 3:
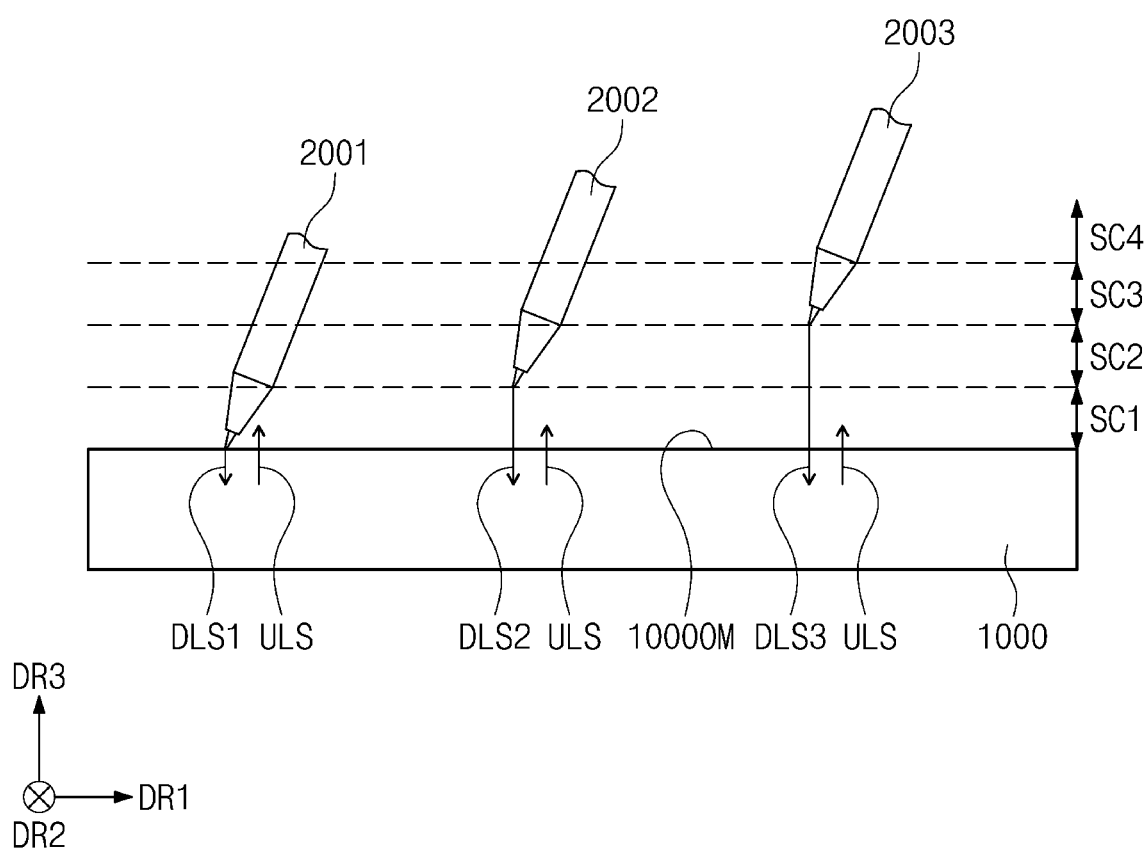
FIG. 3 is a view for describing an operation between a display device and an input device according to some embodiments of the inventive concept.

FIG. 3 is a view for describing an operation between a display device and an input device according to some embodiments of the inventive concept.

Referring to FIGS. 1 and 3, the display device 1000 may provide an uplink signal ULS. The uplink signal ULS may be provided from a sensor layer of the display device 1000, and a detailed description thereof will be given later. The uplink signal ULS may be referred to as a first signal ULS hereinafter.

A first section SC1, a second section SC2, a third section SC3, and a fourth section SC4 are illustrated from a top surface 10000M of the display device 1000. The first to fourth sections SC1 to SC4 may be defined in a direction away from the top surface 10000M.

FIG. 3 illustrates an example of a first state 2001 in which the input device 2000 is positioned in the first section SC1, a second state 2002 in which the input device 2000 is positioned in the second section SC2, and a third state 2003 in which the input device 2000 is positioned in the third section SC3.

The input device 2000 may receive the first signal ULS in each of the first state 2001, the second state 2002, and the third state 2003. The input device 2000 may output a second signal DLS1, DLS2, or DLS3 on the basis of the first signal ULS. The second signal DLS1, DLS2, or DLS3 may correspond to the downlink signal described with reference to FIG. 1 above.

According to some embodiments of the inventive concept, the input device 2000 may output the second signal DLS1, DLS2, or DLS3 whose strength is adjusted according to a separation distance between the input device 2000 and the display device 1000. For example, a second strength of the second signal DLS2 outputted from the input device 2000 in the second state 2002 may be greater than a first strength of the second signal DLS1 outputted from the input device 2000 in the first state 2001, and a third strength of the second signal DLS3 outputted from the input device 2000 in the third state 2003 may be greater than the second strength.

For example, a first voltage level of the second signal DLS1 and a second voltage level of the second signal DLS2 may be different from each other. The first and second voltage levels may be determined according to the separation distance between the input device 2000 and the display device 1000. For example, the second voltage level may be higher than the first voltage level.

The first section SC1 may be a section with a separation distance of about 0 mm to about 5 mm, the second section SC2 may be a section with a separation distance of about 5 mm to about 10 mm, and the third section SC3 may be a section with a separation distance of about 10 mm to about 15 mm. However, this is merely an example, and embodiments of the inventive concept is not limited thereto. A maximum voltage of the second signal DLS1 may be about 17 volts in the first section SC1, a maximum voltage of the second signal DLS2 may be about 25 volts in the second section SC2, and a maximum voltage of the second signal DLS3 may be about 32 volts in the third section SC3. The maximum voltages of the second signals DLS1, DLS2, and DLS3 in the first to third sections SC1, SC2, and SC3, respectively, are example values and are not particularly limited thereto.

According to some embodiments of the inventive concept, because the strength of the second signal DLS1, DLS2, or DLS3 outputted from the input device 2000 is adjusted, the region or distance within which the display device 1000 may sense the input device 2000 may increase. The display device 1000 may sense a signal provided from the input device 2000 not only when the input device 2000 is in direct contact with the display device 1000 but also when the input device 2000 is spaced apart from the display device 1000 by a distance (e.g., a set or predetermined distance). Accordingly, a sense of use or a sense of writing of the input device 2000 that a user feels may be improved.

The first section SC1, the second section SC2, and the third section SC3 may correspond to a section in which the display device 1000 may sense an input by the input device 2000, and the fourth section SC4 may correspond to a section in which the display device 1000 does not sense or is not capable of sensing the input by the input device 2000.

Although described as an example in FIG. 3 as being divided into the first to third sections SC1, SC2, and SC3, the section where sensing is possible may only be divided into a plurality of sections and is not particularly limited thereto.

That is, there may be additional sections, or fewer sections, without departing from the spirit and scope of embodiments according to the inventive concept.

Figure 4A:
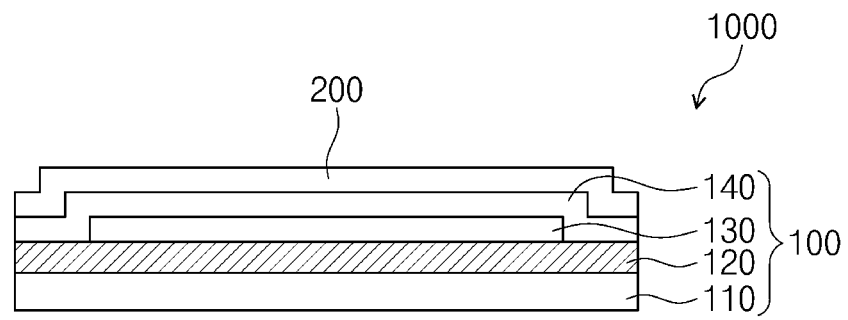
FIG. 4A is a schematic cross-sectional view of a display device according to some embodiments of the inventive concept.
Figure 4A:
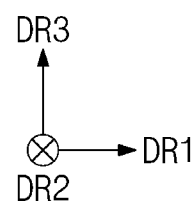

FIG. 4A is a schematic cross-sectional view of a display device according to some embodiments of the inventive concept.

Referring to FIG. 4A, the display device 1000 may include a display layer 100 and a sensor layer 200.

The display layer 100 may be a component that substantially generates an image. The display layer 100 may be a light emitting display layer and may be, for example, an organic light emitting display layer, a quantum dot display layer, or a micro LED display layer.

The display layer 100 may include a base layer 110, a circuit layer 120, a light emitting element layer 130, and an encapsulation layer 140.

The base layer 110 may be a member that provides a base surface on which the circuit layer 120 is located. The base layer 110 may be a glass substrate, a metal substrate, a polymer substrate, or the like. However, embodiments are not limited thereto, and the base layer 110 may be an inorganic layer, an organic layer, or a composite material layer.

The base layer 110 may have a multilayer structure. For example, the base layer 110 may include a first synthetic resin layer, a silicon oxide (SiOx) layer located on the first synthetic resin layer, an amorphous silicon (a-Si) layer located on the silicon oxide layer, and a second synthetic resin layer located on the amorphous silicon layer. The silicon oxide layer and the amorphous silicon layer may be referred to as a base barrier layer.

Each of the first and second synthetic resin layers may include polyimide-based resin. Alternatively, each of the first and second synthetic resin layers may include at least one of acrylate-based resin, methacrylate-based resin, polyisoprene-based resin, vinyl-based resin, epoxy-based resin, urethane-based resin, cellulose-based resin, siloxane-based resin, polyamide-based resin, or perylene-based resin. In this specification, meanwhile, "~~"-based resin means that the resin includes a functional group of "~~".

The circuit layer 120 may be located on the base layer 110. The circuit layer 120 may include an insulating layer, a semiconductor pattern, a conductive pattern, a signal line, and the like. The insulating layer, a semiconductor layer, and a conductive layer may be formed on the base layer 110 in a method such as coating and deposition, and thereafter, the insulating layer, the semiconductor layer, and the conductive layer may be selectively patterned through a plurality of photolithography processes. Thereafter, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, a quantum dot, a quantum rod, or a micro LED.

The encapsulation layer 140 may be located on the light emitting element layer 130. The encapsulation layer 140 may protect the light emitting element layer 130 from foreign matter such as moisture, oxygen, and dust particles.

The sensor layer 200 may be located on the display layer 100. The sensor layer 200 may sense an external input applied from the outside. The external input may be a user input. The user input may include various types of external inputs such as a part of a user's body, light, heat, a pen, and pressure.

The sensor layer 200 may be formed on the display layer 100 through a continuous process. In this case, the sensor layer 200 may be said to be directly located or directly formed or directly arranged on the display layer 100. The expressions "directly located", "directly formed", and "directly arranged" may mean that a third component is not located between the sensor layer 200 and the display layer 100. That is, a separate adhesive member may not be located between the sensor layer 200 and the display layer 100.

Alternatively, the sensor layer 200 may be bonded to the display layer 100 by an adhesive member. The adhesive member may include a typical adhesive or a typical detachable adhesive.

According to some embodiments, an anti-reflection layer and an optical layer located on the sensor layer 200 may be further included in the display device 1000. The anti-reflection layer may reduce the degree of reflection of external light incident from outside of the display device 1000. The optical layer may control the direction of light incident from the display layer 100 to improve front luminance of the display device 1000.

Figure 4B:
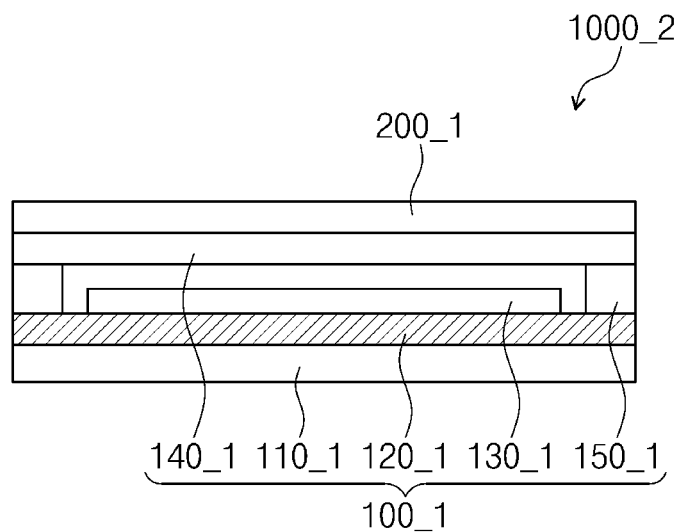
FIG. 4B is a schematic cross-sectional view of a display device according to some embodiments of the inventive concept.

FIG. 4B is a schematic cross-sectional view of a display device according to some embodiments of the inventive concept.

Referring to FIG. 4B, a display device 1000_2 may include a display layer 100_1 and a sensor layer 200_1. The display layer 100_1 may include a base substrate 110_1, a circuit layer 120_1, a light emitting element layer 130_1, an encapsulation substrate 140_1, and a bonding member 150_1.

Each of the base substrate 110_1 and the encapsulation substrate 140_1 may be a glass substrate, a metal substrate, a polymer substrate, or the like but is not particularly limited thereto.

The bonding member 150_1 may be located between the base substrate 110_1 and the encapsulation substrate 140_1. The bonding member 150_1 may bond the encapsulation substrate 140_1 to the base substrate 110_1 or the circuit layer 120_1. The bonding member 150_1 may include an inorganic material or an organic material. For example, the inorganic material may include a frit seal, and the organic material may include photocurable resin or photoplastic resin. However, a material constituting the bonding member 150_1 is not limited to the above example.

The sensor layer 200_1 may be directly located on the encapsulation substrate 140_1. The expression "directly located" may mean that a third component is not located between the sensor layer 200_1 and the display layer 100_1. That is, a separate adhesive member may not be located between the sensor layer 200_1 and the display layer 100_1. However, embodiments of the inventive concept are not limited thereto, and an adhesive layer may be further located between the sensor layer 200_1 and the encapsulation substrate 140_1.

Figure 5:
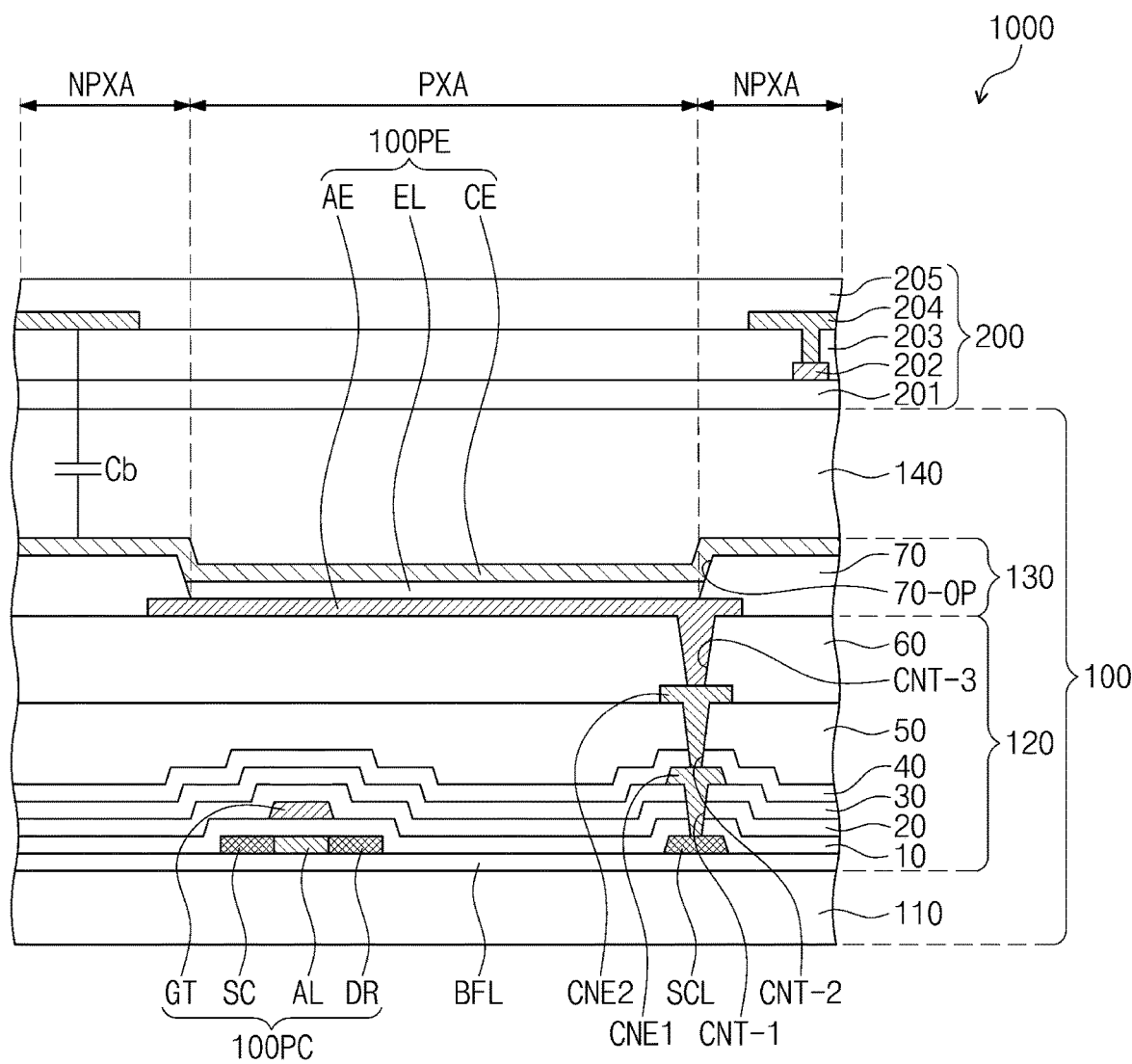
FIG. 5 is a cross-sectional view of a display device according to some embodiments of the inventive concept.

FIG. 5 is a cross-sectional view of a display device according to some embodiments of the inventive concept.

Referring to FIG. 5, at least one inorganic layer is formed on a top surface of the base layer 110. The inorganic layer may include at least one of aluminum oxide, titanium oxide, silicon oxide, silicon nitride, silicon oxynitride, zirconium oxide, or hafnium oxide. The inorganic layer may be formed in multiple inorganic layers. The multiple inorganic layers may constitute a barrier layer and/or a buffer layer. According to some embodiments, the display layer 100 is illustrated to include a buffer layer BFL.

The buffer layer BFL may improve the bonding force between the base layer 110 and the semiconductor pattern.

The buffer layer BFL may include at least one of silicon oxide, silicon nitride, or silicon oxynitride. For example, the buffer layer BFL may include a structure in which a silicon oxide layer and a silicon nitride layer are alternately laminated.

The semiconductor pattern may be located on the buffer layer BFL. The semiconductor pattern may include polysilicon. However, the semiconductor pattern is not limited thereto and may include amorphous silicon or an oxide semiconductor.

FIG. 5 illustrates only a portion of the semiconductor pattern, and another portion of the semiconductor pattern may be further located in another area. The semiconductor pattern may be arranged by a specific rule across pixels. The semiconductor pattern may have different electrical properties according to whether the same is doped. The semiconductor pattern may include a first region having a high conductivity and a second region having a low conductivity. The first region may be doped with an N-type dopant or a P-type dopant. A P-type transistor may include a doped region doped with the P-type dopant, and an N-type transistor may include a doped region doped with the N-type dopant. The second region may be a non-doped region or a region doped in a lower concentration than the first region.

The conductivity of the first region may be higher than the conductivity of the second region, and the first region may substantially serve as an electrode or a signal line. The second region may substantially correspond to an active (or a channel) of a transistor. In other words, a portion of the semiconductor pattern may be the active of the transistor, another portion thereof may be a source or a drain of the transistor, and another portion thereof may be a connection electrode or a connection signal line.

Each of the pixels may have an equivalent circuit including seven transistors, one capacitor, and a light emitting element, and an equivalent circuit diagram of the pixel may be modified into various forms. In FIG. 5, one transistor 100PC and a light emitting element 100PE included in the pixel are illustrated by way of example.

A source SC, an active AL, and a drain DR of the transistor 100PC may be formed from the semiconductor pattern. The source SC and the drain DR may extend in opposite directions from the active AL when viewed on a cross section. FIG. 5 illustrates a portion of a connection signal wiring SCL formed from the semiconductor pattern. According to some embodiments, the connection signal wiring SCL may be connected to the drain DR of the transistor 100PC when viewed in a plane.

A first insulating layer 10 may be located on the buffer layer BFL. The first insulating layer 10 may overlap the plurality of pixels in common and cover the semiconductor pattern. The first insulating layer 10 may be an inorganic layer and/or an organic layer and may have a single-layer structure or a multilayer structure. The first insulating layer 10 may include at least one of aluminum oxide, titanium oxide, silicon oxide, silicon nitride, silicon oxynitride, zirconium oxide, or hafnium oxide. According to some embodiments, the first insulating layer 10 may be a single-layer silicon oxide layer. In addition to the first insulating layer 10, an insulating layer of the circuit layer 120 to be described later may be an inorganic layer and/or an organic layer and may have a single-layer structure or a multilayer structure. The inorganic layer may include at least one of the above-described materials but is not limited thereto.

A gate GT of the transistor 100PC is located on the first insulating layer 10. The gate GT may be a portion of a metal pattern. The gate GT overlaps the active AL. In a process of doping the semiconductor pattern, the gate GT may function as a mask.

A second insulating layer 20 may be located on the first insulating layer 10 and may cover the gate GT. The second insulating layer 20 may overlap the pixels in common. The second insulating layer 20 may be an inorganic layer and/or an organic layer and may have a single-layer structure or a multilayer structure. The second insulating layer 20 may include at least one of silicon oxide, silicon nitride, or silicon oxynitride. According to some embodiments, the second insulating layer 20 may have a multilayer structure including a silicon oxide layer and a silicon nitride layer.

A third insulating layer 30 may be located on the second insulating layer 20. The third insulating layer 30 may have a single-layer structure or a multilayer structure. For example, the third insulating layer 30 may have a multilayer structure including a silicon oxide layer and a silicon nitride layer.

A first connection electrode CNE1 may be located on the third insulating layer 30. The first connection electrode CNE1 may be connected to the connection signal wiring SCL through a contact hole CNT-1 penetrating the first, second, and third insulating layers 10, 20, and 30.

A fourth insulating layer 40 may be located on the third insulating layer 30. The fourth insulating layer 40 may be a single-layer silicon oxide layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 penetrating the fourth insulating layer 40 and the fifth insulating layer 50.

A sixth insulating layer 60 may be located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic light emitting material, a quantum dot, a quantum rod, or a micro LED. Hereinafter, the light emitting element 100PE is described as an organic light emitting element by way of example but embodiments according to the present inventive concept are not particularly limited thereto.

The light emitting element 100PE may include a first electrode AE, a light emitting layer EL, and a second electrode CE.

The first electrode AE may be located on the sixth insulating layer 60. The first electrode AE may be connected to the second connection electrode CNE2 through a contact hole CNT-3 penetrating the sixth insulating layer 60.

A pixel defining film 70 may be located on the sixth insulating layer 60 and may cover a portion of the first electrode AE. An opening 70-OP is defined in the pixel defining film 70. The opening 70-OP of the pixel defining film 70 exposes at least a portion of the first electrode AE.

The active area 1000A (see FIG. 1) may include a light emitting area PXA and a non-light emitting area NPXA adjacent to the light emitting area PXA. The non-light emitting area NPXA may surround the light emitting area PXA. According to some embodiments, the light emitting area PXA is defined to correspond to the portion of the first electrode AE exposed by the opening 70-OP.

The light emitting layer EL may be located on the first electrode AE. The light emitting layer EL may be located in an area corresponding to the opening 70-OP.

That is, the light emitting layer EL may be formed separately in each of the pixels. The light emitting layer EL may be provided in plurality. When the light emitting layer EL is formed separately in each of the pixels, each of the light emitting layers EL may emit light having at least one color of blue, red, or green. However, the light emitting layer EL is not limited thereto and may be connected to pixels and provided in common. In this case, the light emitting layer EL may provide blue light or white light.

The second electrode CE may be located on the light emitting layer EL. The second electrode CE may have an integral shape and may be arranged in common in the plurality of pixels.

According to some embodiments, a hole control layer may be located between the first electrode AE and the light emitting layer EL. The hole control layer may be located in common in the light emitting area PXA and the non-light emitting area NPXA. The hole control layer may include a hole transport layer and may further include a hole injection layer. An electron control layer may be located between the light emitting layer EL and the second electrode CE. The electron control layer may include an electron transport layer and may further include an electron injection layer. The hole control layer and the electron control layer may be formed in common in the plurality of pixels by using an open mask.

The encapsulation layer 140 may be located on the light emitting element layer 130. The encapsulation layer 140 may include an inorganic layer, an organic layer, and an inorganic layer sequentially laminated, but layers constituting the encapsulation layer 140 are not limited thereto.

The inorganic layers may protect the light emitting element layer 130 from moisture and oxygen, and the organic layer may protect the light emitting element layer 130 from foreign matter such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer but is not limited thereto.

The sensor layer 200 may be formed on the display layer 100 through a continuous process. In this case, the sensor layer 200 may be said to be directly located on the display layer 100. The expression "directly located" may mean that a third component is not located between the sensor layer 200 and the display layer 100. That is, a separate adhesive member may not be located between the sensor layer 200 and the display layer 100. Alternatively, the sensor layer 200 may be bonded to the display layer 100 by an adhesive member. The adhesive member may include a typical adhesive or a typical detachable adhesive.

The sensor layer 200 may include a base layer 201, a first conductive layer 202, a sensing insulating layer 203, a second conductive layer 204, and a cover insulating layer 205.

The base layer 201 may be an inorganic layer including at least one of silicon nitride, silicon oxynitride, or silicon oxide. Alternatively, the base layer 201 may be an organic layer including epoxy resin, acrylic resin, or imide-based resin. The base layer 201 may have a single-layer structure or a multilayer structure laminated in the third direction DR3.

Each of the first conductive layer 202 and the second conductive layer 204 may have a single-layer structure or may have a multilayer structure laminated in the third direction DR3.

The conductive layer of the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), and indium zinc tin oxide (IZTO). In addition, the transparent conductive layer may include a conductive polymer such as PEDOT, metal nanowires, graphene, and the like.

The conductive layer of the multilayer structure may include metal layers. The metal layers may have, for example, a three-layer structure of titanium/aluminum/titanium. The conductive layer of the multilayer structure may include at least one metal layer and at least one transparent conductive layer.

At least one of the sensing insulating layer 203 or the cover insulating layer 205 may include an inorganic film. The inorganic film may include at least one of aluminum oxide, titanium oxide, silicon oxide, silicon nitride, silicon oxynitride, zirconium oxide, or hafnium oxide.

At least one of the sensing insulating layer 203 or the cover insulating layer 205 may include an organic film. The organic film may include at least one of acrylate-based resin, methacrylate-based resin, polyisoprene-based resin, vinyl-based resin, epoxy-based resin, urethane-based resin, cellulose-based resin, siloxane-based resin, polyimide-based resin, polyamide-based resin, or perylene-based resin.

Parasitic capacitance Cb may be generated between the sensor layer 200 and the second electrode CE. The parasitic capacitance Cb may be referred to as base capacitance or a panel load. As the distance between the sensor layer 200 and the second electrode CE becomes shorter, the parasitic capacitance Cb may increase. As the parasitic capacitance Cb increases, the ratio of an amount of change in capacitance to a reference value may decrease. The amount of change in the capacitance refers to a change in capacitance occurring between before and after an input by an input means such as the input device 2000 (see FIG. 1) and the touch 3000 (see FIG. 1) is applied.

When the input device 2000 (see FIG. 1) is spaced apart from the display device 1000 (see FIG. 1) by a distance (e.g., a set or predetermined distance), the strength of a signal provided from the input device 2000 (see FIG. 1) may decrease. In this case, the signal may be attenuated and may not be transmitted to a sensor driver 200C (see FIG. 7A). This may cause degradation in sense of writing of the input device 2000 (see FIG. 1). When, in consideration of the degradation, the strength of the signal is increased so that the signal is transmitted to the sensor driver 200C (see FIG. 7A) even when the input device 2000 (see FIG. 1) is spaced apart from the display device 1000 by the distance (e.g., the set or predetermined distance), the input device 2000 (see FIG. 1) may affect the display device 1000 and thus cause degradation of image quality.

According to some embodiments of the inventive concept, the input device 2000 (see FIG. 1) may detect the distance between the input device 2000 (see FIG. 1) and the display device 1000 on the basis of the strength of a signal provided from the sensor layer 200, and accordingly, the input device 2000 may adjust the strength of a signal that is outputted therefrom.

Figure 7A:
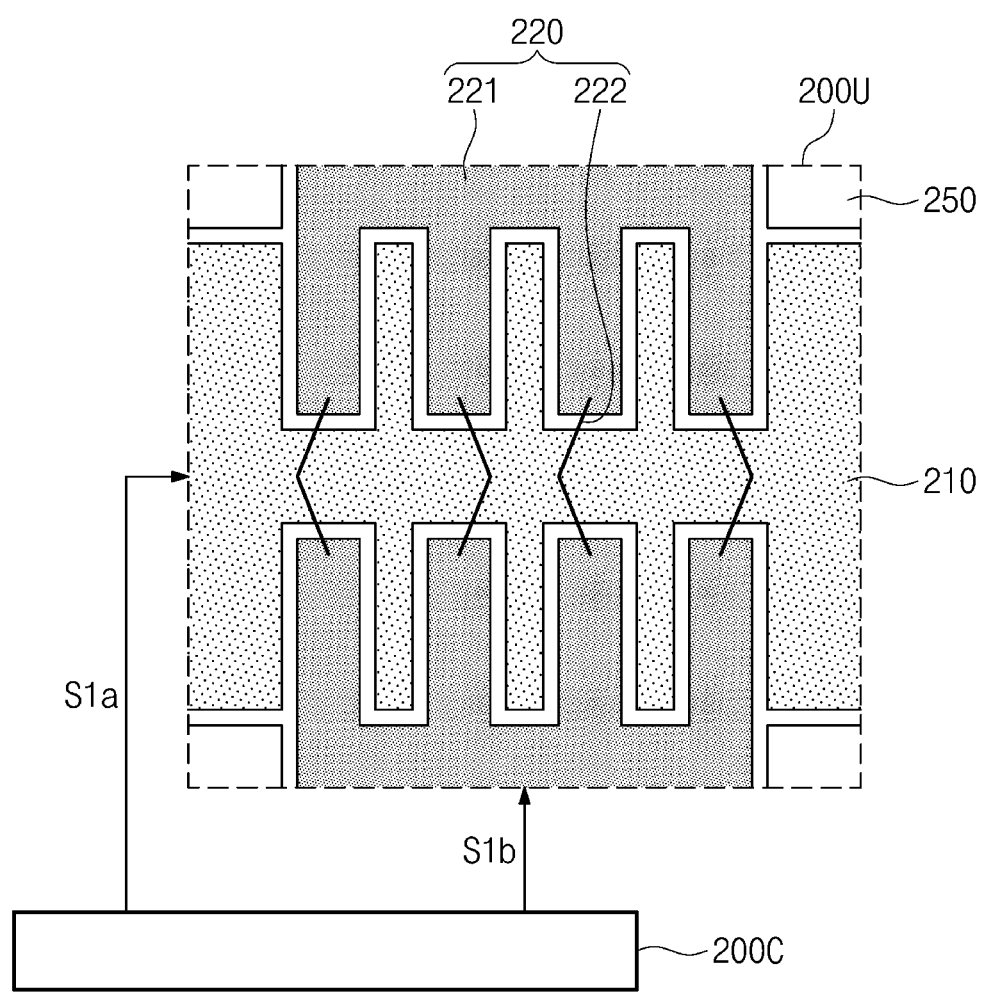
FIGS. 7A and 7B are views for describing an operation in a first mode of a sensor layer.

For example, when the input device 2000 (see FIG. 1) is spaced apart from the display device 1000 by a distance (e.g., a set or predetermined distance), the strength of a signal the input device 2000 (see FIG. 1) outputs may be increased, and accordingly, the signal may be transmitted to the sensor driver 200C (see FIG. 7A). Accordingly, a user's sense of writing for the input device 2000 (see FIG. 1) may be improved.

In addition, when the distance between the input device 2000 (see FIG. 1) and the display device 1000 becomes short, the strength of a signal that the input device 2000 (see FIG. 1) outputs may decrease accordingly. Thus, degradation in image quality of the display device 1000 by the input device 2000 (see FIG. 1) may be reduced or removed.

Figure 6:
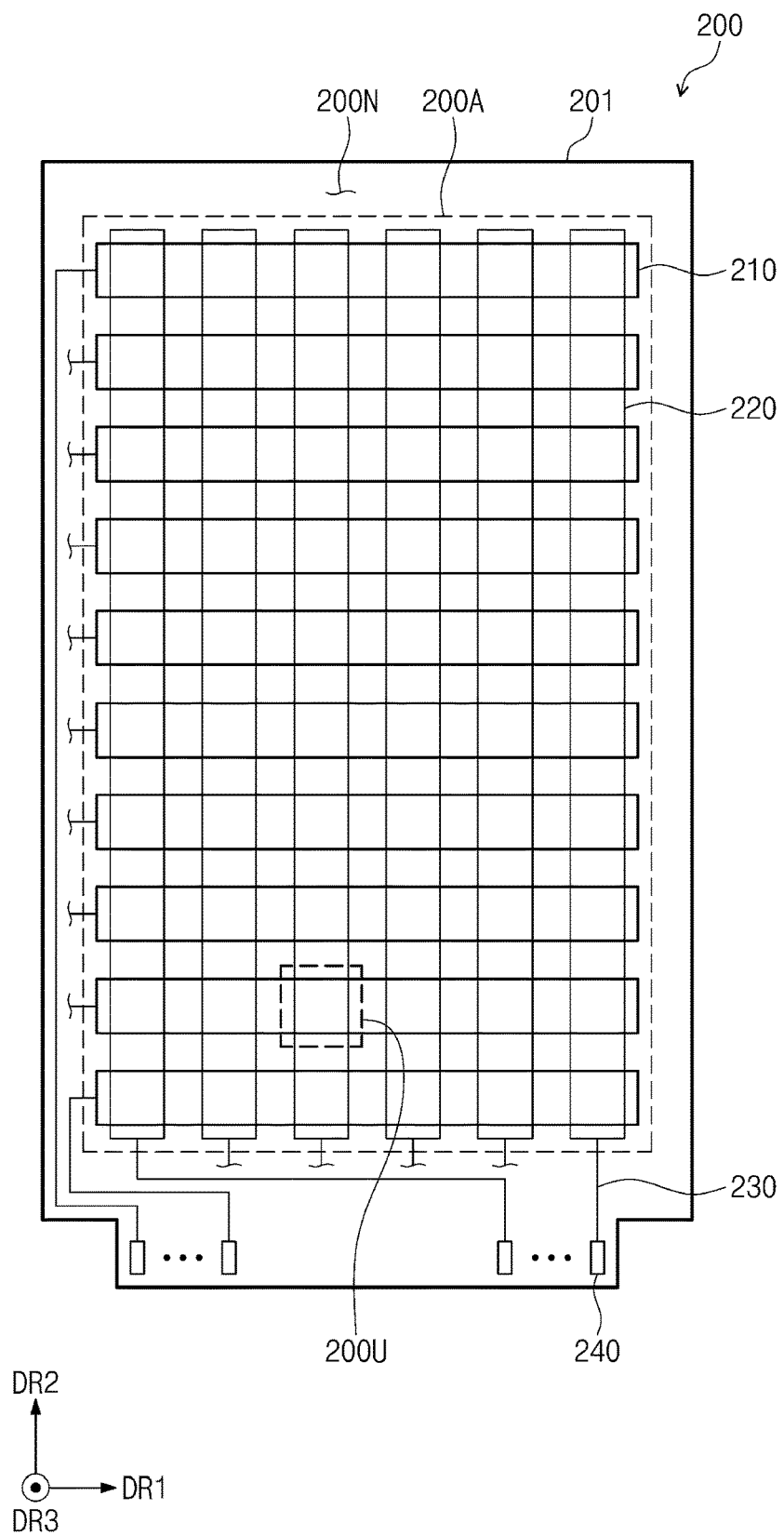
FIG. 6 is a plan view of a sensor layer according to some embodiments of the inventive concept.

FIG. 6 is a plan view of a sensor layer according to some embodiments of the inventive concept.

Referring to FIG. 6, a sensing area 200A and a peripheral area 200N may be defined in the sensor layer 200. The sensing area 200A may correspond to the active area 1000A illustrated in FIG. 1, and the peripheral area 200N may correspond to the peripheral area 1000NA illustrated in FIG. 1.

The sensor layer 200 may include electrodes 210, cross electrodes 220, wirings 230, and pads 240.

The electrodes 210 may each extend in the first direction DR1 and may be arranged to be spaced apart from each other in the second direction DR2. The cross electrodes 220 may each extend in the second direction DR2 and may be arranged to be spaced apart from each other in the first direction DR1.

Each of the electrodes 210 and the cross electrodes 220 may be electrically connected to a corresponding one of the wirings 230. In FIG. 6, a single routing structure in which one wiring 230 is connected to one electrode 210 and one wiring 230 is connected to one cross electrode 220 is illustrated as an example, but embodiments of the inventive concept are not particularly limited thereto. For example, two wirings 230 may be connected to each of the cross electrodes 220. Alternatively, two wirings 230 may also be connected to each of the electrodes 210, and two wirings 230 may be connected to each of the cross electrodes 220.

The pads 240 may be electrically connected to the wirings 230, respectively. The sensor layer 200 may be electrically connected to the sensor driver 200C (see FIG. 7A) through the pads 240.

Figure 7B:
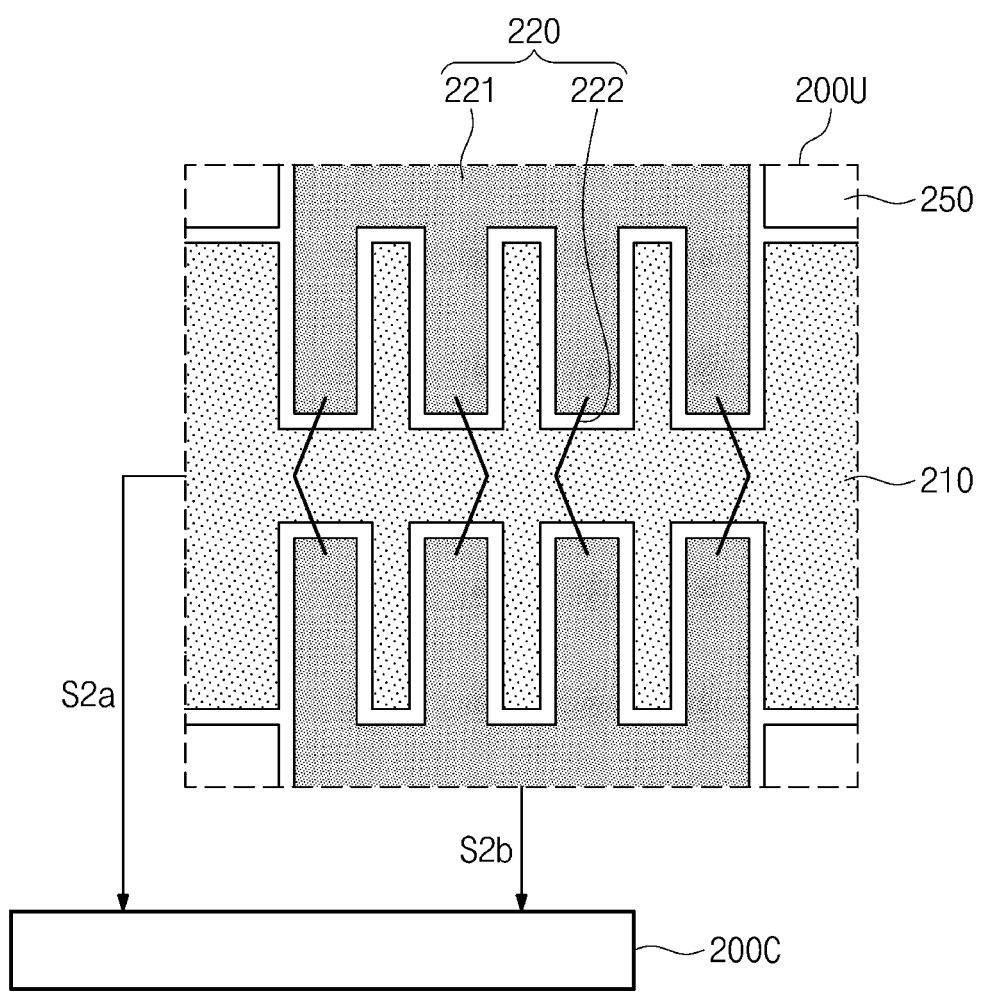

FIGS. 7A and 7B are views for describing an operation in a first mode of a sensor layer.

Referring to FIGS. 6, 7A, and 7B, a portion of one electrode 210 and a portion of one cross electrode 220 may be defined as one sensing unit 200U. In each of FIGS. 7A and 7B, the one sensing unit 200U is enlarged and illustrated.

The cross electrode 220 may include cross patterns 221 and bridge patterns 222 electrically connected to the cross patterns 221. The cross patterns 221 may be spaced apart with the electrode 210 interposed therebetween. The bridge patterns 222 may overlap the electrode 210 and cross the electrode 210 in an insulated manner. The cross patterns 221 and the electrode 210 may be located in the same layer, and the bridge patterns 222 may be located in a layer different from the layer of the cross patterns 221 and the electrode 210. For example, the cross patterns 221 and the electrode 210 may be included in the second conductive layer 204 (see FIG. 5), the bridge patterns 222 may be included in the first conductive layer 202 (see FIG. 5), and this structure may be referred to as a bottom bridge structure. However, embodiments of the inventive concept are not particularly limited thereto. For example, the cross patterns 221 and the electrode 210 may be included in the first conductive layer 202 (see FIG. 5), the bridge patterns 222 may be included in the second conductive layer 204 (see FIG. 5), and this structure may be referred to as a top bridge structure.

In addition, the sensor layer 200 may further include a dummy pattern 250 located in an area where the cross patterns 221 and the electrode 210 are not located. The dummy pattern 250 may be provided to prevent the electrode 210 and the cross electrode 220 from being viewed from the outside, and the dummy pattern 250 may be an electrically floating pattern.

Referring to FIGS. 7A and 7B, the first mode may be a mode in which the display device 1000 (see FIG. 1) and the input device 2000 (see FIG. 1) transmit and receive data with each other. The operation illustrated in FIG. 7A may be an operation in which the display device 1000 (see FIG. 1) provides first signals to the input device 2000 (see FIG. 1). The operation illustrated in FIG. 7B may be an operation in which the input device 2000 (see FIG. 1) provides second signals to the display device 1000 (see FIG. 1).

Referring to FIG. 7A, the electrode 210 and the cross electrode 220 may be used as transmitting electrodes for respectively providing the input device 2000 (see FIG. 1) with first signals S1a and S1b provided from the sensor driver 200C. The first signals S1a and S1b may be referred to as the uplink signals. FIG. 7A illustrates an example in which both the electrode 210 and the cross electrode 220 are used as transmitting electrodes, but embodiments of the inventive concept are not particularly limited thereto. For example, either the electrode 210 or the cross electrode 220 may be used as a transmitting electrode.

Referring to FIG. 7B, the electrode 210 and the cross electrode 220 may be used as receiving electrodes for respectively transmitting, to the sensor driver 200C, sensing signals S2a and S2b induced from the input device 2000 (see FIG. 1). The sensor driver 200C may receive a first sensing signal S2a from the electrode 210 and receive a second sensing signal S2b from the cross electrode 220.

Figure 8:
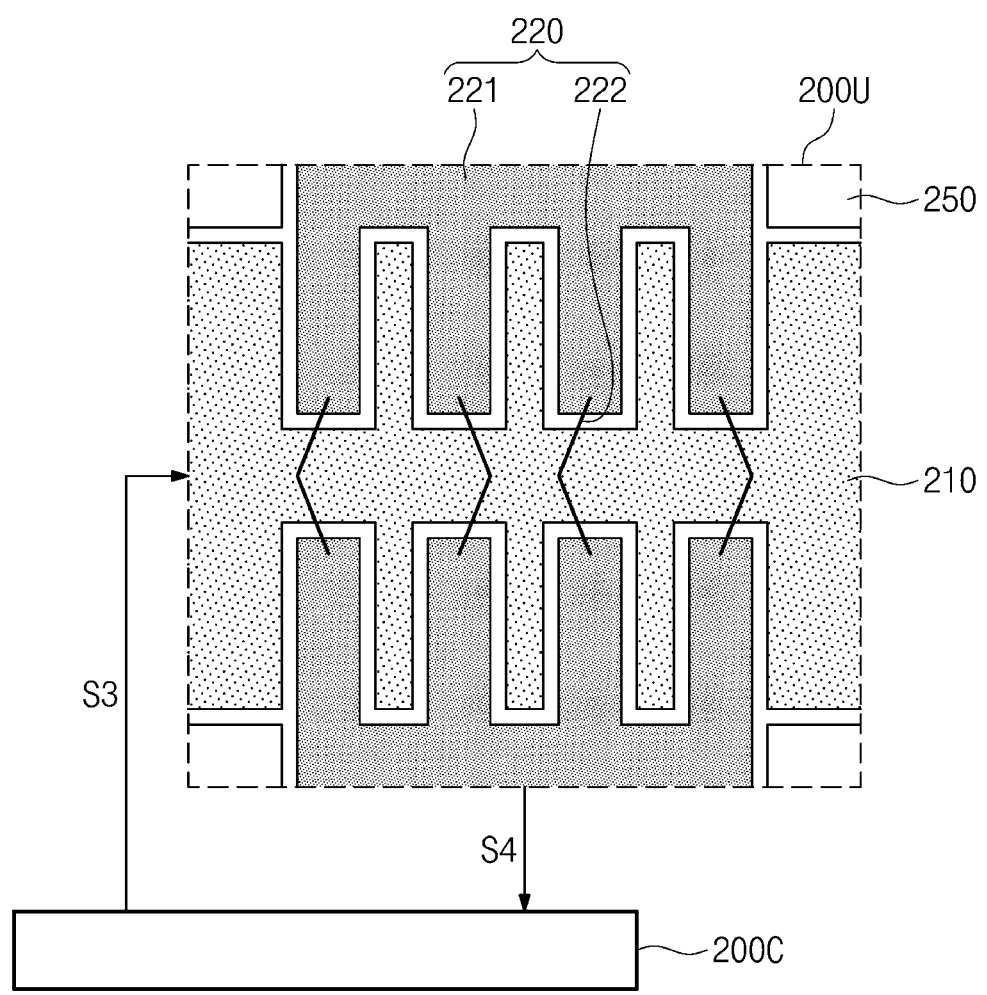
FIG. 8 is a view for describing an operation in a second mode of a sensor layer.

FIG. 8 is a view for describing an operation in a second mode of a sensor layer.

Referring to FIGS. 6 and 8, the sensor driver 200C may sense the second input by the touch 3000 (see FIG. 1) in the second mode. In the second mode, the sensor driver 200C may sense an external input by sensing an amount of change in mutual capacitance formed between the electrode 210 and the cross electrode 220.

The sensor driver 200C may provide a driving signal S3 to the electrode 210 and receive a sensing signal S4 from the cross electrode 220. That is, in the second mode, the electrode 210 may function as a transmitting electrode, and the cross electrode 220 may function as a receiving electrode. However, embodiments of the inventive concept are not particularly limited thereto. For example, the electrode 210 may function as a receiving electrode, and the cross electrode 220 may function as a transmitting electrode.

Figure 9:
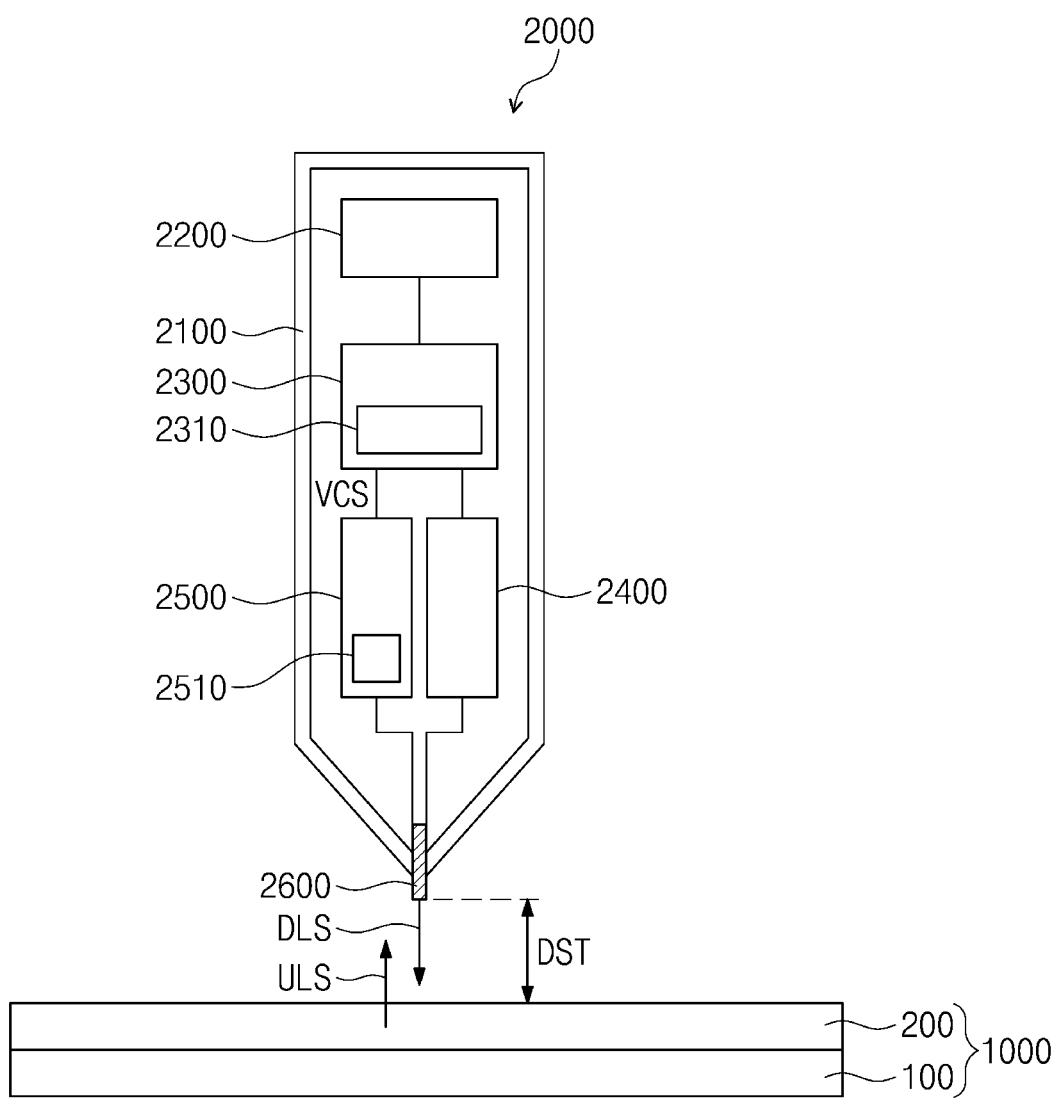
FIG. 9 is a block diagram of an input device according to some embodiments of the inventive concept.

FIG. 9 is a block diagram of an input device according to some embodiments of the inventive concept.

Referring to FIG. 9, the input device 2000 may include a housing 2100, a power supply 2200, a controller 2300, a receiver 2400, a transmitter 2500, and an electrode 2600. However, components constituting the input device 2000 are not limited to the components listed above. For example, the input device 2000 may further include an electrode switch for switching the input device 2000 between a signal transmission mode and a signal reception mode, a pressure sensor for sensing pressure, memory for storing information (e.g., set or predetermined information), a rotation sensor for sensing rotation, or the like.

The housing 2100 may have a pen shape and may have an accommodation space formed therein. The power supply 2200, the controller 2300, the receiver 2400, the transmitter 2500, and the electrode 2600 may be accommodated in the accommodation space defined in the housing 2100.

The power supply 2200 may supply power to the controller 2300, the receiver 2400, and the transmitter 2500 inside the input device 2000. The power supply 2200 may include a battery or a high-capacitance capacitor.

The controller 2300 may control an operation of the input device 2000. The controller 2300 may be an application-specific integrated circuit (ASIC). The controller 2300 may be configured to operate according to a designed program.

The receiver 2400 and the transmitter 2500 may be referred to as a communication module. The receiver 2400 may receive the first signal ULS provided from the sensor layer 200. The receiver 2400 may modulate the first signal ULS into a signal the controller 2300 may process. The transmitter 2500 may receive a signal provided from the controller 2300 and modulate the signal into a signal the sensor layer 200 may sense. The transmitter 2500 may output a second signal DLS through the electrode 2600.

The controller 2300 may control operations of the receiver 2400 and the transmitter 2500. The controller 2300 may include a distance calculator 2310 that calculates a separation distance DST between the electrode 2600 and the display device 1000 on the basis of the first signal ULS received through the receiver 2400.

The controller 2300 may store therein a reference capacitance value between the electrode 2600 and the sensor layer 200 when the separation distance DST is a minimum value. The distance calculator 2310 may calculate the separation distance DST on the basis of the reference capacitance value and a measured capacitance value. The controller 2300 may generate a voltage adjustment signal VCS including voltage information according to the separation distance DST.

The transmitter 2500 may include a voltage adjuster 2510 that adjusts the strength of the second signal DLS. The voltage adjuster 2510 may receive the voltage adjustment signal VCS from the controller 2300 and adjust the strength of the second signal DLS on the basis of the voltage adjustment signal VCS.

The input device 2000 according to some embodiments of the inventive concept may increase the strength of the second signal DLS as the strength of the first signal ULS decreases. Also, as the strength of the first signal ULS increases, the input device 2000 may decrease the strength of the second signal DLS. Accordingly, when the separation distance DST between the display device 1000 and the input device 2000 is within a range (e.g., a set or predetermined range), the display device 1000 may relatively uniformly receive the input from the input device 2000. Accordingly, the interface device IFS (see FIG. 1) including the display device 1000 and the input device 2000 with relatively improved sensing performance may be provided.

Figure 10:
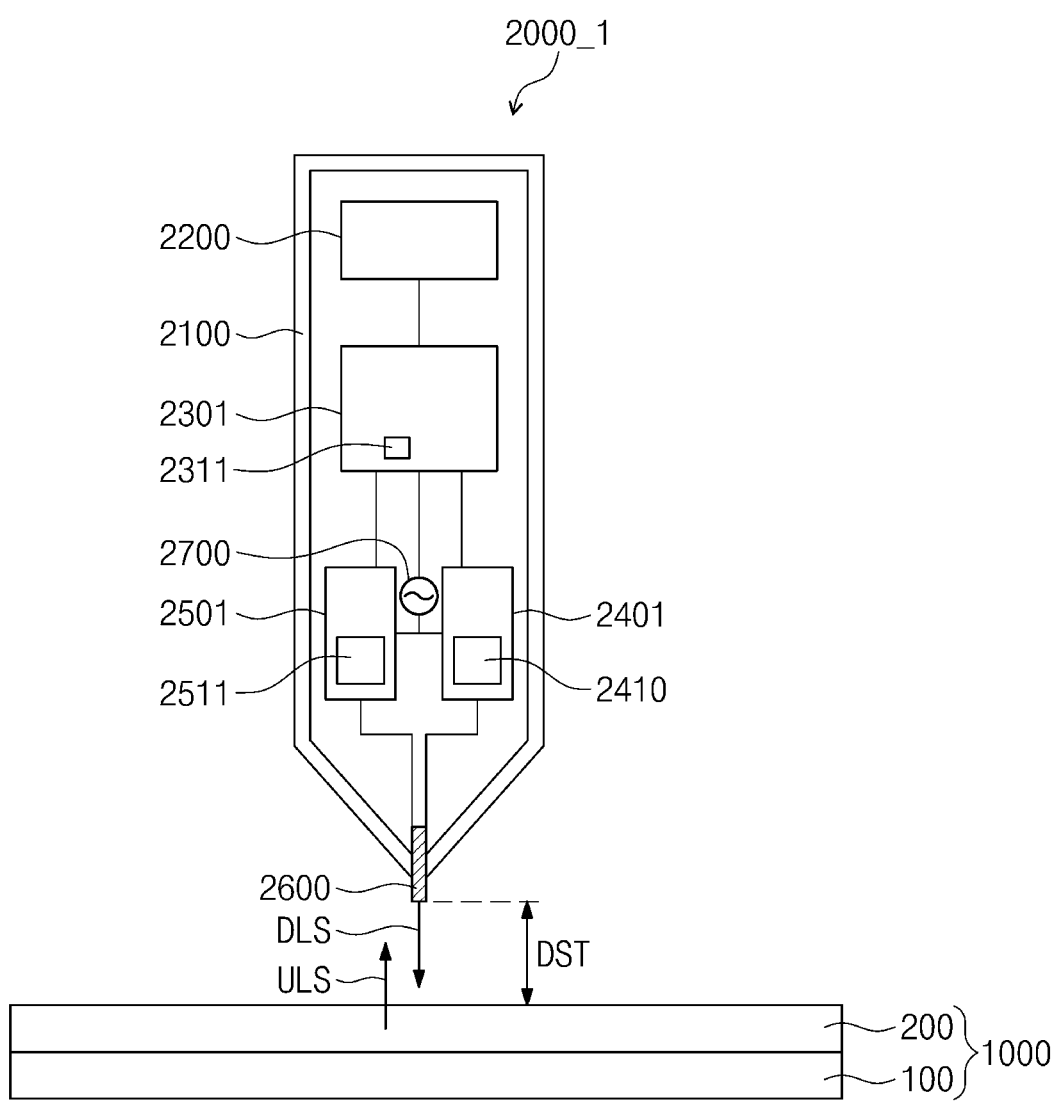
FIG. 10 is a block diagram of an input device according to some embodiments of the inventive concept.

FIG. 10 is a block diagram of an input device according to some embodiments of the inventive concept.

Referring to FIG. 10, an input device 2000_1 may include a housing 2100, a power supply 2200, a controller 2301, a receiver 2401, a transmitter 2501, an electrode 2600, and an oscillator 2700.

The receiver 2401 may receive the first signal ULS provided from the sensor layer 200. The receiver 2401 may include a hover detector 2410 that detects a separation distance DST on the basis of the strength of the first signal ULS. The hover detector 2410 may be configured with a comparator but embodiments according to the present inventive concept are not particularly limited to the above-described example as long as the hover detector 2410 is formed in a configuration capable of determining the strength of the first signal ULS the receiver 2401 receives.

The transmitter 2501 may include a voltage adjuster 2511 that adjusts the strength of a second signal DLS. The voltage adjuster 2511 may adjust the strength of the second signal DLS to a voltage level corresponding to the separation distance DST detected by the hover detector 2410. For example, the controller 2301 may include a lookup table 2311. The lookup table 2311 may store therein a value of the voltage level corresponding to the separation distance DST. Accordingly, the controller 2301 may provide the transmitter 2501 with a value of the voltage level matched with information detected by the receiver 2401 without a separate calculation. In this case, the time for calculating a value of the voltage level according to the separation distance DST may be reduced, so that information processing speed may be improved.

The oscillator 2700 may be a component that changes a frequency according to a changed value of the voltage level. The controller 2301 may further include a lookup table in which a frequency value corresponding to the separation distance DST is stored.

As described above, as the strength of the first signal provided from the sensor layer decreases, the input device may increase the strength of the second signal outputted from the input device. Also, the input device may decrease the strength of the second signal as the strength of the first signal increases. Accordingly, when the distance between the display device and the input device is within a range (e.g., a set or predetermined range), the display device may relatively uniformly receive the input from the input device. Accordingly, the interface device including the display device and the input device with relatively improved sensing performance may be provided.

Although aspects of some embodiments of the inventive concept have been described herein, it is understood that various changes and modifications can be made by those skilled in the art within the spirit and scope of the inventive concept defined by the following claims or the equivalents. Therefore, the embodiments described herein are not intended to limit the technical spirit and scope of the present invention, and all technical spirit within the scope of the following claims or the equivalents will be construed as being included in the scope of the present invention.

What is claimed is:

1. An interface device comprising:
a display device including a display layer and a sensor layer on the display layer; and
an input device configured to receive a first signal from the sensor layer and to output a second signal to the sensor layer,
wherein a strength of the second signal is determined according to a separation distance between the display device and the input device; and
a controller configured to control operations of the input device, wherein the controller comprises a lookup table in which a voltage value according to the separation distance is stored, and the controller is configured to control the strength of the second signal based on the voltage value and the separation distance.

2. The interface device of claim 1, wherein the input device comprises:
an electrode;
a receiver configured to receive the first signal through the electrode; and
a transmitter which includes a voltage adjuster configured to adjust the strength of the second signal, wherein the transmitter is configured to output the second signal through the electrode,
wherein the separation distance is a distance between the electrode and the display device.

3. The interface device of claim 2, wherein the controller comprises a distance calculator configured to calculate the separation distance on the basis of the first signal received through the receiver.

4. An interface device comprising:
a display device including a display layer and a sensor layer on the display layer; and
an input device comprising:
an electrode;
a receiver configured to receive a first signal from the sensor layer;
a transmitter configured to output a second signal and including a voltage adjuster configured to adjust a strength of the second signal; and
a controller configured to control operations of the receiver and the transmitter and comprising a distance calculator configured to calculate a separation distance on the basis of the first signal,
wherein the separation distance is a distance between the electrode and the sensor layer, and
wherein a reference capacitance value between the electrode and the sensor layer when the separation distance is a minimum value is stored in the controller.

5. The interface device of claim 4, wherein the distance calculator is configured to calculate the separation distance on the basis of the reference capacitance value, and the controller is configured to generate a voltage adjustment signal including voltage information according to the separation distance.

6. The interface device of claim 5, wherein the voltage adjuster is configured to adjust the strength of the second signal based on the voltage adjustment signal.

7. The interface device of claim 2, wherein the receiver comprises a hover detector configured to detect the separation distance based on a strength of the first signal.

8. The interface device of claim 7, wherein the controller is configured to provide the voltage adjuster with information about a voltage value according to the separation distance detected by the hover detector.

9. The interface device of claim 8, wherein the controller is configured to provide the voltage adjuster with the voltage value corresponding to the separation distance.

10. The interface device of claim 1, wherein a first strength of the second signal when the separation distance is a first distance is smaller than a second strength of the second signal when the separation distance is a second distance longer than the first distance.

11. The interface device of claim 1, wherein a voltage level of the second signal has a first voltage level or a second voltage level different from the first voltage level and is determined according to the separation distance.

12. The interface device of claim 1, wherein the display layer comprises a base layer, a circuit layer on the base layer, a light emitting element layer on the circuit layer, and an encapsulation layer on the light emitting element layer, and the sensor layer is directly on the encapsulation layer.

13. The interface device of claim 1, wherein the display device further comprises a sensor driver configured to control an operation of the sensor layer,
   wherein the sensor layer comprises an electrode extending in a first direction and a cross electrode extending in a second direction crossing the first direction, and the sensor driver is configured to sense an input by the input device based on a change in capacitance of each of the electrode and the cross electrode and to sense a touch input based on a change in mutual capacitance between the electrode and the cross electrode.

14. The interface device of claim 1, wherein the input device is an active pen.

15. An input device comprising:
an electrode;
a receiver configured to receive a first signal through the electrode;
a transmitter configured to output a second signal through the electrode; and
a controller configured to control operations of the receiver and the transmitter,
wherein the transmitter comprises a voltage adjuster configured to adjust a voltage level of the second signal on the basis of the first signal,
wherein the controller is configured to access a lookup table in which a voltage value according to a separation distance is stored, and the controller is configured to control a strength of the second signal based on the voltage value and the separation distance.

16. The input device of claim 15, wherein
the controller comprises a distance calculator configured to calculate a separation distance between an object providing the first signal and the electrode based on the first signal received through the receiver, and
the controller is configured to generate a voltage adjustment signal including voltage information according to the separation distance.

17. The input device of claim 16, wherein the voltage adjuster is configured to adjust the voltage level of the second signal based on the voltage adjustment signal.

18. The input device of claim 15, wherein the receiver comprises a hover detector configured to detect a separation distance between an object providing the first signal and the electrode based on the first signal.

19. The input device of claim 18, wherein the voltage adjuster is configured to adjust the voltage level of the second signal based on a voltage value selected according to the separation distance detected by the hover detector.

20. The input device of claim 15, wherein the voltage level of the second signal is increased when strength of the first signal decreases.

* * * * *